May 16, 1961 P. N. ARMSTRONG ET AL 2,984,822

TWO-WAY DATA COMPARE-SORT APPARATUS

Filed Nov. 28, 1958 2 Sheets-Sheet 1

INVENTORS.
PHILIP N. ARMSTRONG,
ELMER E. JUNGCLAS, JR.,
GEORGE WOLFE, JR.,

BY

Robert H. Himes

ATTORNEY

INVENTORS
PHILIP N. ARMSTRONG,
ELMER E. JUNGCLAS, JR.,
GEORGE WOLFE, JR.,
BY
Robert H. Himes
ATTORNEY United States Patent Office 2,984,822
Patented May 16, 1961

2,984,822

TWO-WAY DATA COMPARE-SORT APPARATUS

Philip N. Armstrong, Santa Monica, Elmer E. Jungclas, Jr., Garden Grove, and George Wolfe, Jr., La Mirada, Calif., assignors to Hughes Aircraft Company, Culver City, Calif., a corporation of Delaware Filed Nov. 28, 1958, Ser. No. 777,551

11 Claims. (Cl. 340—149)

This invention relates to a system for comparing and sorting character data and, more particularly, to a data handling apparatus for directing character data that is stored in two record blocks to appropriate high and low lines as determined by the relative magnitude of the character data.

The two-way data compare-sort apparatus of the present invention is a basic element of the type out of which sorting apparatus adapted to sort three or more character data may be composed. For example, sorting apparatus composed of basic elements of the disclosed type that is adapted to simultaneously arrange six character data in a predetermined ordered sequence as defined by the relative magnitude of the character data is disclosed in copending application for patent entitled: Minimal Storage Sorter, Philip N. Armstrong, inventor, Serial No. 771,482, filed November 3, 1958, which application is assigned to the same assignee as is the present case. In particular, the apparatus thus disclosed for simultaneously arranging six character data is composed of twelve two-way data compare-sort units of the type herewith disclosed. As is evident in this apparatus, it is essential that several of the two-way data compare-sort units of the present invention be used in cascade. That is, it is often necessary to use from six to ten of the two-way data compare sort units in cascade to simultaneously arrange a plurality of character data. In order to effect a single compare-sort operation, present day two-way data compare-sort apparatus generally requires a plurality of clock signals within each bit interval thereby deteriorating the output signals to the extent that retiming of each signal between each successive pair of units in cascade becomes necessary. In a complex sorting apparatus, this requires the introduction of substantial amounts of additional circuitry.

It is therefore an object of the present invention to provide an improved two-way data compare-sort apparatus.

Another object of the present invention is to provide a two-way data compare-sort apparatus which operates with only the delay that is inherent in the components constituting the apparatus.

Still another object of the present invention is to provide a two-way data compare-sort apparatus which requires only a single clock pulse within each bit interval.

A further object of the present invention is to provide a two-way data compare-sort apparatus adapted to direct two character data to appropriate "Hi" and "Lo" lines as defined by the relative magnitude of predetermined initial portions of the character data.

According to the present invention, first and second signals are gated through first and second "and" gates, respectively, and a first "or" gate to a high or "Hi" line. In addition, complements of the first and second character data signals are gated through third and fourth "and" gates, respectively, and an "or" gate to a complementary low or $\overline{\text{Lo}}$ line. The passage of the character data signals through the "and" gates is controlled by the complementary outputs from an inhibit flip-flop and an exchange flip-flop. In particular, the complementary output from the inhibit flip-flop is connected to inputs of both the second and third "and" gates, and the complementary output from the exchange flip-flop is connected to inputs of the first and fourth "and" gates. In accordance with the present invention, the character data signals pass through all of the "and" gates so long as the signals are of the same level, i.e., the signals are either both at the information level or at the zero level. Also, if one character data signal is larger than the remaining signal, the signals will continue to pass through the respective "and" gates whereby no delay is introduced. Near the latter portion of each bit interval, however, this condition is detected and the appropriate inhibit or exchange flip-flop is set in a manner to latch-connect the appropriate character data signals to respective "Hi" or $\overline{\text{Lo}}$ lines, as the case dictates. Complementary high or $\overline{\text{Hi}}$ and "Lo" lines are provided by appropriate inverters.

It is sometimes desired to direct character data signals to the "Hi" and "Lo" lines in accordance with the relative magnitude of a predetermined initial portion thereof. This predetermined initial portion is referred to as the "control number" of the character data. In the present device, character data is arranged in accordance with control numbers by employing a control signal to set the inhibit flip-flop during the last bit of the control number if an exchange has not and is not going to be made.

The above-mentioned and other features and objects of this invention and the manner of obtaining them will become more apparent by reference to the following description taken in conjunction with the accompanying drawings, wherein.

Figure 1:
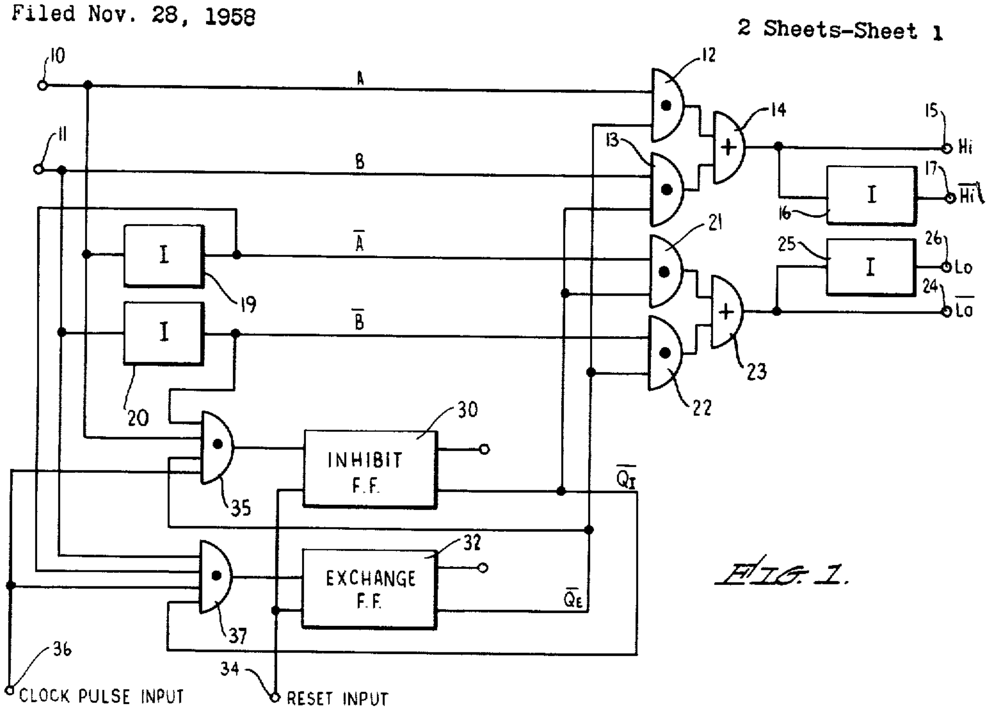
Fig. 1 illustrates a schematic block diagram of a preferred embodiment of the invention.

In describing the apparatus of the present invention, a convention is employed wherein individual "and" and "or" gates are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level, whereas an "or" gate produces an information level output signal when any one of the input signals thereto are at the information level.

Also, in addition to the above, a convention is employed in describing the particular embodiment of the present invention wherein the upper and lower inputs to the flip-flops, as they appear in the drawing, are designated as the "set" and "reset" inputs, respectively. An information level signal applied to either the set or reset inputs of a flip-flop will change its state in a manner such that an information level signal appears at the corresponding principal or complementary output terminals, respectively. Further, if information level signals are applied to both the set and reset inputs of a flip-flop, the state of the flip-flop will change in accordance with the last signal applied.

An illustrative and preferred embodiment of the device of the present invention is shown in Fig. 1. Referring to Fig. 1, a two-way data compare-sort apparatus 10 receives first and second input signals A, B at terminals 10, 11, respectively. In order to effect sorting, it is necessary that these input signals constitute binary words arranged with the most significant bits first. The terminals 10, 11 are connected through "and" gates 12, 13, respectively, to the inputs of an "or" gate 14, the output of which is connected to a "Hi" output terminal 15. A complementary Hi output, $\overline{Hi}$, may be provided by connecting the output of "or" gate 14 through an inverter 16 to a $\overline{Hi}$ output terminal 17. Next, the terminals 10, 11 are connected through inverters 19, 20, respectively, to the inputs of "and" gates 21, 22, the outputs of which are connected through an "or" gate 23 to a complementary Lo or $\overline{Lo}$ output terminal 24. A low output is then provided by connecting the output of "or" gate 23 through an inverter 25 to a Lo output terminal 26.

In addition to the above, the two-way data compare-sort apparatus includes an inhibit flip-flop 30 and an exchange flip-flop 32. Both the inhibit and exchange flip-flops 30, 32 have a reset input which is coupled to a reset input terminal 34 to which record count pulses are applied at the commencement of each record block in a manner hereinafter explained. The set input to the inhibit flip-flop 30 is connected to the output of an "and" gate 35 which, in turn, has inputs connected to terminal 10, the output of the inverter 20, the complementary output of exchange flip-flop 32 and to a clock pulse input terminal 36 thereby to receive signals A, $\bar{B}$, $\bar{Q}_E$, and clock pulses, respectively. The set input of the exchange flip-flop 32, on the other hand, is connected to the output of an "and" gate 37 which has inputs connected to terminal 11, the output of inverter 19 which is connected to terminal 10, the clock pulse input terminal 36 and to the complementary output of inhibit flip-flop 30 thereby to receive input signals B, $\bar{A}$, clock pulses and $\bar{Q}_I$, respectively. Lastly, the complementary output of inhibit flip-flop 30 is connected also to inputs of "and" gates 13 and 21, and the complementary output from the exchange flip-flop 32 is connected to inputs of "and" gates 12, 22.

Figure 3:
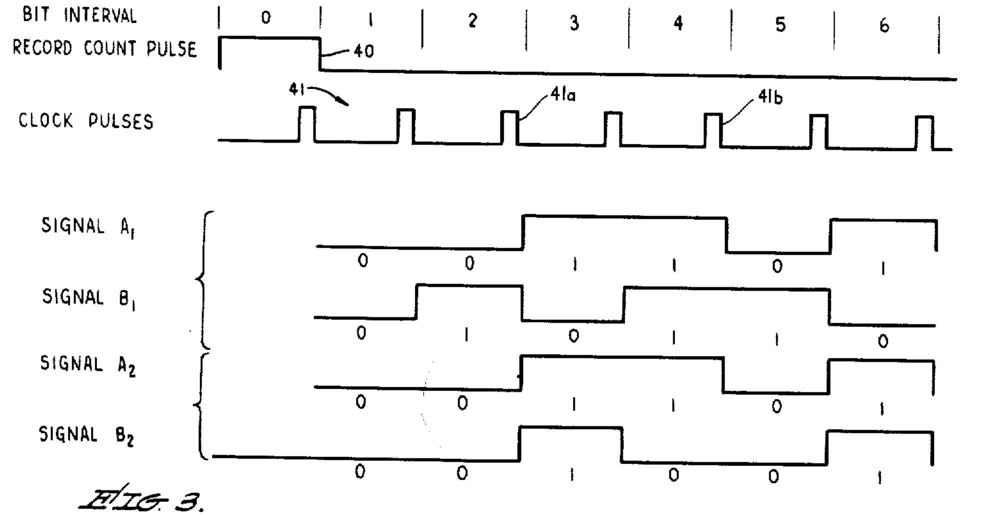
Fig. 3 shows timing signals which appear in the apparatus of Fig. 1.

In order to explain more clearly the operation of the two-way data compare-sort apparatus of Fig. 1, reference is made to the timing signal chart of Fig. 3 which illustrates a record block having only six bit intervals by way of example. In a typical case a record block might include four hundred eighty bits.

Referring to Fig. 3, a record count pulse 40 is produced at the commencement of each record block which, for reference purposes, is shown in bit interval "0." A clock pulse signal 41, on the other hand, constitutes a series of pulses which occur in the latter portion of each bit interval. In operation, the record count pulses 40 are applied through the reset input terminal 34 to the reset inputs of the inhibit and exchange flip-flops 30, 32, whereby the respective complementary output signals $\bar{Q}_I$, $\bar{Q}_E$ both constitute information level voltages. Thus, all the inputs to the "and" gates 12, 13, 21 and 22 from the inhibit and exchange flip-flops 30, 32 initially have an information level signal applied thereto. The signals applied to terminals 10, 11 so long as they are identical, may, therefore, flow through "and" gates 12, 13 and the "or" gate 14 to the Hi output terminal 15. Similarly, the complements of the A, B applied to terminals 10, 11 appearing at the outputs of the inverters 19, 20, respectively, so long as they are identical, may both flow through the "and" gates 21, 22 and the "or" gate 23 to the $\overline{Lo}$ output terminal 24.

Consider now signals A, B of Fig. 3 and, in particular, bit interval 2 wherein the signal applied to terminal 11 is at the information level and the signal applied to terminal 10 is at the zero level. In that the inverter 19 connected to terminal 10 will produce an information level signal in response to a zero level input, the three inputs, exclusive of the clock pulse input to "and" gate 37, namely, the signal $B_1$ applied to terminal 11, the complement, $\bar{A}_1$, of the signal applied to terminal 10, and the complementary output signal $\bar{Q}_I$ from exchange flip-flop 30, are at the information level, thereby allowing the clock pulse 41*a* to set the exchange flip-flop 32. The setting of the exchange flip-flop 32 removes the information level signal from "and" gates 12 and 22 as well as from "and" gate 35, thereby leaving only the terminal 11 connected through to the Hi output terminal 15 and only the inverter 19 connected from terminal 10 and through "and" gate 21 and "or" gate 23 to the $\overline{Lo}$ output terminal 24. In addition, the removal of the information level signal $\bar{Q}_E$ from "and" gate 35 prevents any change in the state of the inhibit flip-flop 30 during the remainder of the record block interval. In the foregoing operation, it is noted that the Lo output signal available at terminal 26 is produced by means of inverter 25 from the $\overline{Lo}$ output signal appearing at terminal 24. This is done in this manner because when one of the signals applied to terminals 10, 11 is greater than the other, the signal appearing at the $\overline{Lo}$ output terminal 24 will always be at the information level whereas the Lo output signal appearing at terminal 26 will be at the zero level without delay from the commencement of the bit interval. Thus the clock pulse serves to sample the signals A, B during each bit interval and detect when an existing state exists wherein one of the signals is at the information level and the other at the zero level and accordingly effect the latch-connecting of the appropriate terminals 10, 11 to the Hi and Lo output terminals 15, 26, respectively, by the setting of either the inhibit flip-flop 30 or the exchange flip-flop 32.

Alternative to the above situation, consider signals $A_2$, $B_2$ during bit interval 4 when the signals for the first time during the record block differ in level, the signal applied to terminal 10 being at the information level and the signal applied to terminal 11 being at the zero level. In that there have been no prior differences during bit intervals 1 to 3 between the signals $A_2$, $B_2$ applied to terminals 10 and 11, it is apparent that the complementary output signal $\bar{Q}_I$ from inhibit flip-flop 30, the complement $\bar{B}_2$ of the signal at terminal 11 and the signal $A_2$ at terminal 10 which signals are applied to the inputs of "and" gate 35 will all be at the information level thereby allowing the clock pulse 41*b* to set the inhibit flip-flop 30. Setting of the inhibit flip-flop 30 removes the $\bar{Q}_I$ signal from the input of "and" gate 37 thereby preventing any subsequent changes of state by the exchange flip-flop 32 during the record block interval. In addition, the signal $\bar{Q}_I$ is removed from the "and" gates 13, 21 thereby leaving terminal 10 connected through the "and" gate 12 and "or" gate 14 to the Hi output terminal 15, the terminal 11 connected through inverter 20, "and" gate 22, "or" gate 23 and inverter 25 to the Lo output terminal 26.

Figure 2:
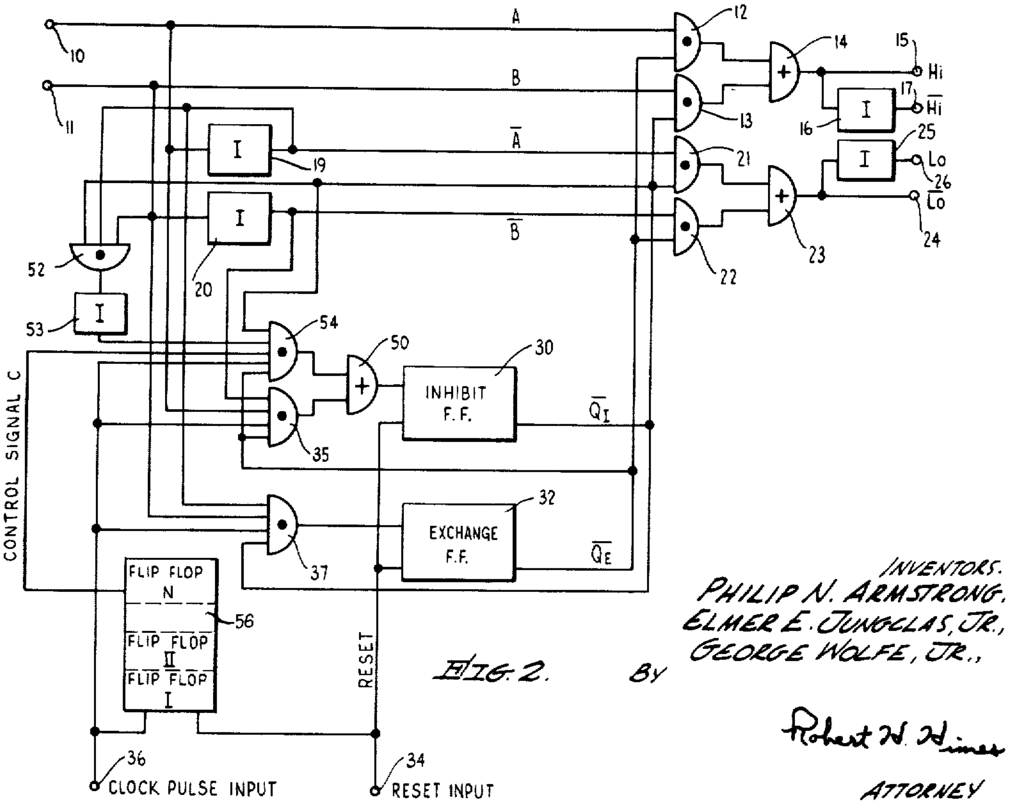
Fig. 2 illustrates the apparatus of Fig. 1 adapted to arrange character data in accordance with a control number.

It is sometimes desirable to perform sorting in accordance with the magnitude of only an initial portion within each character data. As previously specified, this "initial portion" of the character data is referred to as a control number. Referring now to Fig. 2, there is illustrated the two-way data compare-sort apparatus shown in Fig. 1 modified in a manner to sort on the basis of a control number having five bits. These modifications comprise an "or" gate 50 interposed between the "and" gate 35 and the set input of the inhibit flip-flop 30. In addition, an "and" gate 52 having inputs connected to terminal 11, the output of inverter 19, and the complementary output of inhibit flip-flop 30 thereby to be responsive, respectively, to signals B, $\bar{A}$ and $\bar{Q}_I$. The output of "and" gate 52 is connected through inverter 53 to an input to an "and" gate 54, the output of which is connected to an input to "or" gate 50. In addition to the connection to the output of inverter 53, the "and" gate 54 has inputs connected to the complementary outputs of both the inhibit and exchange flip-flops 30, 32, the clock pulse input terminal 36 and to the control signal output of a counter 56. Counter 56 has a reset input connected to input terminal 34 thereby to be reset by the record count pulses 40 and a set input connected to input terminal 36 so as to count the number of clock pulses after being reset by each record count pulse 40. The principal and complementary outputs of the flip-flops included in the counter 56 are appropriately gated to produce a control signal C which rises to the information level during the last bit interval of the control number after which it is immaterial whether the control signal C returns to the zero level or remains at the information level for the duration of the record block.

Figure 4:
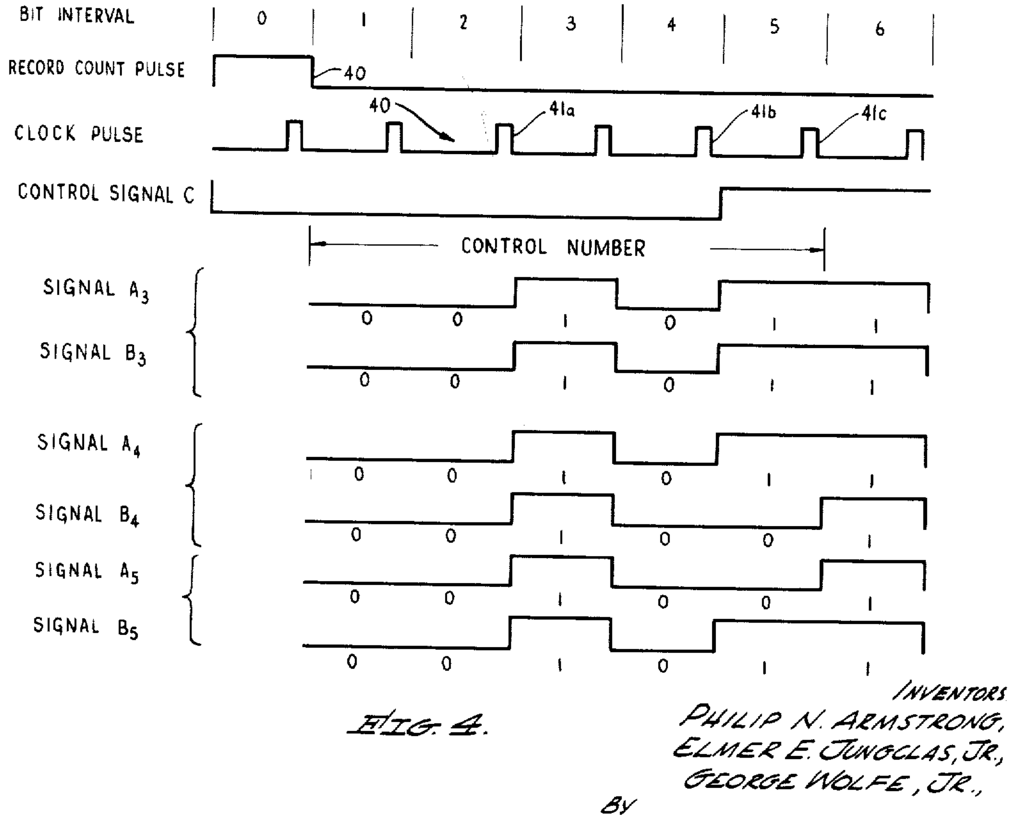
Fig. 4 shows timing signals which appear in the apparatus of Fig. 2.

Referring to Fig. 4, there is shown three possible signal variations: namely, signals $A_3$, $B_3$; $A_4$, $B_4$; and $A_5$, $B_5$ to illustrate the operation of the two-way data compare-sort apparatus of Fig. 2. In that a control number is selected which covers the first five bit intervals of the record block, the counter 56 is adapted to produce a C signal which remains at the zero level during bit intervals 1–4 and rises to the information level during bit interval 5, the last bit of the control number. As mentioned above, it is immaterial whether the control signal C remains at the information level or returns to the zero level during bit interval 6 and during the remainder of the record block.

Signals $A_3$, $B_3$ of Fig. 4 illustrate a first possibility wherein both signals remain the same throughout the entire five bit intervals of the control number. Thus, it is evident that neither the inhibit flip-flop 30 nor the exchange flip-flop 32 will be set during bit intervals 1–4. During the bit interval 5, however, control signal C rises to the information level. The output of "and" gate 52 remains at the zero level in that signals A and B are the same, whereby inverter 53 produces an information level signal which is applied to an input of "and" gate 54 along with control signal C. Also, since the inhibit and exchange flip-flops 30, 32 have not been set, the complementary output signal $\bar{Q}_I$ and $\bar{Q}_E$ which are applied to respective inputs of the "and" gate 54 remain at the information level. Thus, upon the occurrence of clock pulse 41$c$, an information level signal appears at the output of "and" gate 54, which signal is transmitted through "or" gate 50 to set the inhibit flip-flop 30. Setting the inhibit flip-flop 30 reduces the complementary output signal $\bar{Q}_I$ to the zero level for the remainder of the record block, thereby latch-connecting terminal 10, to which signal $A_3$ is applied, to the Hi input terminal 15, and terminal 11 to which signal $B_3$ is applied to Lo output terminal 26.

Signals $A_4$, $B_4$ illustrate another possibility wherein both signals represent the same binary numbers during bit intervals 1–4. During bit interval 5, however, signal $A_4$ represents binary 1 and signal $B_4$ binary 0. In that both signals are identical during bit intervals 1–4 whereby no information level signals can be produced at the outputs of "and" gates 35, 37, the inhibit and exchange flip-flops 30, 32 remain unset through bit interval 4. During the bit interval 5, however, signal $A_4$ is at the information level and signal $B_4$ is at the zero level, whereby the signal at the output of "and" gate 52 remains at the zero level. This signal when applied to inverter 53 produces an information level signal which along with control signal C and complementary output signals $\bar{Q}_I$ and $\bar{Q}_E$ from inhibit and exchange flip-flops 30, 32, respectively, all of which are at the information level, are applied to "and" gate 54. In addition, the signals $A_3$, $\bar{B}_3$ and $\bar{Q}_E$ applied at the inputs of "and" gate 35 are also all at the information level during bit interval 5. Thus upon the occurrence of clock pulse 41$c$ during bit interval 5, information level signals are produced at the output of both "and" gates 35, 54, which signals are applied through "or" gate 50 to the set input of inhibit flip-flop 30, thereby latch-connecting terminal 10 to Hi output terminal 15 and terminal 11 to Lo output terminal 26, as before.

Signals $A_5$, $B_5$ illustrate the remaining possibility, namely, signals that are identical during bit intervals 1–4 and signal $B_5$ being greater than signal $A_5$ during bit interval 5. In that signal $B_5$ is greater than signal $A_5$ during the last bit interval of the control number, it is desired in this case that terminal 11, to which signal $B_5$ is applied, be latch-connected to Hi output terminal 15 and terminal 10, to which signal $A_5$ is applied, be latch-connected to Lo output terminal 26 during the remainder of the record block. In that signals $\bar{Q}_I$, $\bar{A}_5$ and $B_5$ are now all at the information level during bit interval 5, an information level signal is generated at the output of "and" gate 52, which signal is inverted to a zero level signal by inverter 53 and applied to the input of "and" gate 54 thereby preventing an information level signal from being generated at the output of "and" gate 54. The signals $\bar{Q}_I$, $\bar{A}_5$ and $B_5$, all of which are at the information level, are also applied to inputs of "and" gate 37 whereby the appearance of clock pulse 41$c$ during this bit produces an information level signal at the output thereof which sets the exchange flip-flop 32, thereby effecting the aforementioned desired latch-connections of terminal 11 to Hi output terminal 15 and terminal 10 to Lo output terminal 26 during the remainder of the record block.

What is claimed is:

1. A digital computer apparatus comprising first and second gates, each having an input responsive, respectively, to first and second character data signals having the same number of bits; third and fourth gates, each having an input responsive, respectively, to third and fourth character data signals, said third and fourth character data signals being complementary, respectively, to said first and second character data signals; means for sampling said character data signals thereby for generating an electrical indication at a first terminal when said first signal is for the first time greater than and different from said second signal and for generating an electrical indication at a second terminal when said second signal is for the first time greater than and different from said first signal; and means connected to said first and second terminals and having outputs coupled to inputs of said first, second, third and fourth gates for allowing only the greater of said first and second character data signals to flow through said first and second gates and for allowing only the greater of said third and fourth signals to flow through said third and fourth gates.

2. A digital computer apparatus comprising first and second input terminals adapted to be coupled, respectively, to first and second character data signals having the same number of bits; third and fourth input terminals adapted to be coupled, respectively, to third and fourth character data signals, said third and fourth character data signals being complementary, respectively, to said first and second character data signals; first and second "and" gates each having an input connected, respectively, to said first and second input terminals; a first "or" gate having inputs connected to the outputs of said first and second "and" gates; third and fourth "and" gates each having an input connected, respectively, to said third and fourth input terminals; a second "or" gate having inputs connected to the outputs of said third and fourth "and" gates; first means for sampling said character data signals thereby to generate a first trigger pulse when said first signal is for the first time greater than said second signal; second means for sampling said character data signals thereby to generate a second trigger pulse when said second signal is for the first time greater than said first signal; and means coupled to inputs of said first, second, third and fourth "and" gates and responsive to the first in time of said first and second trigger pulses for latch-connecting the input terminal to which the greater of said first and second signals is applied to said first "or" gate and the input terminal to which the greater of said third and fourth signals is applied to said second "or" gate and coupled to said first and second means for sampling said character data signals for disenabling said first and second means thereby to prevent the generation of the second in time of said first and second trigger pulses.

3. The digital computer apparatus as defined in claim 2 which additionally includes an inverter having an input coupled to the output of said second "or" gate thereby to provide an output signal representative of the lesser of said first and second character data signals as defined by the relative magnitudes of the character data represented.

4. The digital computer apparatus as defined in claim 2 which additionally includes first and second inverters having inputs connected, respectively, to said first and second input terminals thereby to generate said third and fourth character data signals.

5. The digital computer apparatus as defined in claim 2 wherein said means responsive to said first and second trigger pulses comprises a first flip-flop having a set input responsive to said first trigger pulse and a complementary output coupled to said second and third "and" gates and said second means for sampling said character data signals; and a second flip-flop having a set input responsive to said second trigger pulse and a complementary output coupled to said first and fourth "and" gates and said first means for sampling said character data signals.

6. A two-way data compare-sort apparatus for handling equal length record blocks each of which includes at least one character data, said apparatus comprising; first and second input terminals adapted to be coupled, respectively, to first and second record block signals; third and fourth input terminals adapted to be coupled, respectively, to third and fourth record block signals, said third and fourth record block signals including character data that is complementary to character data included in said first and second record block signals, respectively; first and second "and" gates each having an input connected, respectively, to said first and second input terminals; third and fourth "and" gates each having an input connected, respectively, to said third and fourth input terminals; a first flip-flop having set and reset inputs and a complementary output, said complementary output being connected to inputs of said second and third "and" gates; a second flip-flop having set and reset inputs and a complementary output, said complementary output being connected to inputs of said first and fourth "and" gates; means for producing and simultaneously applying a reset pulse to the reset inputs of said first and second flip-flops at the commencement of each record block of character data; means for producing periodic clock pulses which occur within a later portion of each bit interval of the character data included in said record block signals; a fifth "and" gate having inputs responsive to said first and fourth record block signals, the complementary output signal of said second flip-flop and said clock pulses having an output coupled to the set input of said first flip-flop thereby to set said first flip-flop when the character data of said first record block signal is for the first time within concurrent record blocks greater than and of a different level from that of said second record block signal; and a sixth "and" gate having inputs responsive to said second and third record block signals, said clock pulses and the complementary output signal of said first flip-flop and having an output connected to the set input of said second flip-flop, thereby to set said second flip-flop when the character data of said first record block signal is for the first time within concurrent record blocks less than and of a different level from that of said second record block signal whereby only the record block signal containing the greater character data is thereafter allowed to flow through either said first or said second "and" gates and only the record block signal containing the complements of the lesser character data is thereafter allowed to flow through either said third or said fourth "and" gates.

7. The two-way data compare-sort apparatus as defined in claim 6 which additionally includes a first "or" gate having inputs connected to the outputs from said first and second "and" gates and an output connected to a first output terminal; a first inverter having an input connected to the output of said first "or" gate and an output connected to a second output terminal; a second "or" gate having inputs connected to the outputs from said third and fourth "and" gates and an output connected to a third output terminal; and a second inverter having an input connected to the output of said second "or" gate and an output connected to a fourth output terminal, whereby the record block signal containing the greater character data and the record block signal containing character data that is the complement thereof appear at said first and second output terminals, respectively, and the record block signal containing the lesser character data and the record block signal containing character data that is the complement thereof appear at said fourth and third output terminals, respectively.

8. The two-way data compare-sort apparatus as defined in claim 6 which additionally includes an "or" gate interposed between the output of said fifth "and" gate and the set input of said first flip-flop; a seventh "and" gate having inputs connected to said second and third input terminals and the complementary output of said first flip-flop; an inverter connected to the output of said seventh "and" gate for producing an exchange control signal that is the complement of the signal appearing at the output of said seventh "and" gate; means for producing an inhibit control signal which signal increases from a zero level to an information level after a predetermined initial portion of the character data within each record block of said first and second record block signals; and an eighth "and" gate having inputs responsive to the complementary output of said second flip-flop, the exchange control signal, the inhibit control signal and said clock pulses and having an output connected to an input of said "or" gate.

9. The two-way data compare-sort apparatus as defined in claim 8 wherein said means for producing said exchange control signal includes a counter having a plurality of flip-flops, a reset input responsive to said reset pulses and a set input responsive to said clock pulses; and gating means responsive to the output of at least one of said plurality of flip-flops thereby to produce said inhibit control signal.

10. A digital computer apparatus comprising first and second input terminals responsive, respectively, to first and second character data signals having the same number of bits; third and fourth input terminals responsive, respectively, to third and fourth character data signals, said third and fourth character data signals being the complements, respectively, of said first and second character data signals; means for sampling at least two of said character data signals for generating an electrical indication at a first terminal when the level of said first character data signal is for the first time greater than and different from the level of said second character data signal and for generating an electrical indication at a second terminal when the level of said second character data signal is for the first time greater than and different from the level of said first character data signal; means coupled to said first and second terminals for generating a first output signal which output signal changes levels in response to the appearance of an electrical indication at said first terminal and for generating a second output signal which output signal changes levels in response to the appearance of an electrical indication at said second terminal; and means coupled to said first, second, third and fourth input terminals and responsive to said first and second output signals for producing at a first output terminal an electrical signal representative of the alternation of the conjunction of said first character data signal and said second output signal and the conjunction of said second character data signal and said first output signal and for producing at a second output terminal an electrical signal representative of the negation of the alternation of the conjunction of said fourth character data signal and said second output signal and the conjunction of said third character data signal and said first output signal.

11. A digital computer apparatus comprising first and second input terminals responsive, respectively, to character data signals, A and B, each having the same number of bits; third and fourth input terminals responsive, respectively to character data signals, $\bar{A}$ and $\bar{B}$, which are complementary, respectively, to said character data signals, A and B; means for sampling at least two of said character data signals, A, B, $\bar{A}$ and $\bar{B}$ for generating an electrical indication at a first terminal when the level of said character data signal, A, is for the first time greater than and different from the level of said character data signal, B, and for generating an electrical indication at a second terminal when the level of said character data signal, B, is for the first time greater than and different from the level of said first character data signal, A; a first bistable device having a set input coupled to said first terminal for generating a complementary output signal, $\bar{Q}_1$, which signal changes from the information to the zero level subsequent to said first bistable device being set by an electrical indication applied to the set input thereof; a second bistable device having a set input coupled to said second terminal for generating a second complementary output signal, $\bar{Q}_2$, which signal changes from the information to the zero level subsequent to said second bistable device being set by an electrical indication applied to the input thereof; and means coupled to said first, second, third and fourth input terminals and to outputs of said first and second bistable devices for producing at a first output terminal an electrical signal representative of the alternation of $A \cdot \bar{Q}_2$ and $B \cdot \bar{Q}_1$ and for producing at a second output terminal an electrical signal representative of the negation of the alternation of $\bar{B} \cdot \bar{Q}_2$ and $\bar{A} \cdot \bar{Q}_1$ wherein a $(\cdot)$ between two signals indicates the conjunction of these signals.

References Cited in the file of this patent

UNITED STATES PATENTS

| | | |
|---|---|---|
| 2,735,082 | Goldberg et al. | Feb. 14, 1956 |
| 2,821,696 | Shiowitz et al. | Jan. 28, 1958 |
| 2,900,620 | Johnson | Aug. 18, 1959 |